United States Patent [19]
Li et al.

[11] Patent Number: 5,644,221
[45] Date of Patent: Jul. 1, 1997

[54] ENDPOINT DETECTION FOR CHEMICAL MECHANICAL POLISHING USING FREQUENCY OR AMPLITUDE MODE

[75] Inventors: Leping Li, Poughkeepsie; Steven George Barbee, Dover Plains; Arnold Halperin, Cortlandt Manor, all of N.Y.

[73] Assignee: International Business Machines Corporation, Armonk, N.Y.

[21] Appl. No.: 620,722

[22] Filed: Mar. 19, 1996

[51] Int. Cl.⁶ .................................................. G01B 27/00
[52] U.S. Cl. .................................... 324/71.5; 324/671
[58] Field of Search .................................... 324/71.5, 671, 324/765, 228, 229, 230, 239, 262, 654, 758

[56] References Cited

U.S. PATENT DOCUMENTS

| | | | |
|---|---|---|---|
| 3,997,835 | 12/1976 | Ando | 324/73.1 |
| 4,567,435 | 1/1986 | Yamada | 324/207 |
| 5,212,442 | 5/1993 | O'Toole | 324/73.1 |

*Primary Examiner*—Christine K. Oda
*Attorney, Agent, or Firm*—Alison D. Mortinger

[57] ABSTRACT

A method and apparatus for endpoint detection in removal of a film from a semiconductor wafer is provided, with a sensor for creating a signal responsive to the film removal process, a positive feedback amplifier coupled to the sensor, the positive feedback amplifier having a mode selector, and an analyzer coupled to the positive feedback amplifier.

18 Claims, 3 Drawing Sheets

ENDPOINT DETECTION FOR CHEMICAL MECHANICAL POLISHING USING FREQUENCY OR AMPLITUDE MODE

FIELD OF THE INVENTION

This invention is directed to in-situ endpoint detection for chemical mechanical polishing of semiconductor wafers.

BACKGROUND OF THE INVENTION

In the semiconductor industry, chemical mechanical polishing (CMP) is used to selectively remove portions of a film from a semiconductor wafer by rotating the wafer against a polishing pad (or rotating the pad against the wafer, or both) with a controlled amount of pressure in the presence of a chemically reactive slurry. Overpolishing (removing too much) or underpolishing (removing too little) of a film results in scrapping or rework of the wafer, which can be very expensive. Various methods have been employed to detect when the desired endpoint for removal has been reached, and the polishing should be stopped. One such method described in copending patent application Ser. No. 08/419,206 filed Apr. 10, 1995 entitled "In-Situ Monitoring of the Change in Thickness of Films" and assigned to the present assignee, uses a resonant tank circuit type sensor which can be located near the back of the wafer during the polishing process. As the polishing process proceeds, the load from the film on the sensor circuit decreases and the sensor generates a signal whose change corresponds to the changing film thickness. In application Ser. No. 08/419,206, the sensor was excited by a swept output from an instrument such as a spectrum analyzer, function generator, or frequency oscillator. The instrument display then showed a resonant peak at the characteristic frequency associated with the sensor circuit being loaded by the film being monitored. As the film was removed, the peak sharpened, increased in amplitude, and shifted to a different frequency. The change in voltage amplitude was used in what we call "manual amplitude mode" to determine the endpoint.

There are several characteristics of manual amplitude mode that are less than desirable when endpoint detection of a chemical-mechanical polishing process is performed. First, it gives a binary response—the peak shift occurs suddenly, indicating endpoint, with no indication of gradual change. A data trace for an individual wafer would resemble a step function, with no indication of polish history, and would lack in sensitivity. Second, external noise interferes easily with the monitoring process. Third, the sensor circuit had to be tuned so that it could differentiate between a load from the wafer with and without metal, which varied according to the conductivity of the underlying wafer. Constant tuning was a result.

Thus there remains a need for an endpoint detection method and apparatus for chemical mechanical polishing that solves the above-listed problems and is suitable for use in large-scale manufacturing.

SUMMARY OF THE INVENTION

It is therefore an object of the present invention to provide a endpoint detection mode which keeps a polish history for every wafer and provides detection sensitivity.

It is a further object to provide endpoint detection that produces a strong signal that is unaffected by external noise.

It is another object to provide an endpoint detection mode that is unaffected by changes in wafer conductivity.

In accordance with the above listed and other objects, a method and apparatus for endpoint detection in removal of a film from a semiconductor wafer is provided, with a sensor for creating a signal responsive to the film removal process, a positive feedback amplifier coupled to the sensor, the positive feedback amplifier having a mode selector, and an analyzer coupled to the positive feedback amplifier.

BRIEF DESCRIPTION OF THE DRAWINGS

These and other features, aspects, and advantages will be more readily apparent and better understood from the following detailed description of the invention, in which.

DESCRIPTION OF THE PREFERRED EMBODIMENTS

Figure 1:
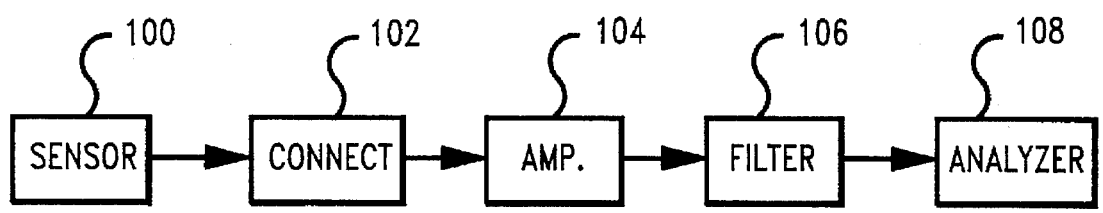
FIG. 1 shows a high level block diagram.

Referring now to the drawings and more particularly to FIG. 1, a high level block diagram is shown. A sensor 100 is coupled to the film to be polished and generates a signal whose change is proportional to the change in thickness of the film as it is removed under the sensor. Thus as the thickness decreases, the signal changes as well. The signal from sensor 100 is transmitted by means of a connection 102 to positive feedback amplifier 104. Amplifier 104 can either enhance the signal (frequency mode) or automatically set the gain (automatic amplitude mode), and then sends the signal to filter 106, where any high order harmonics are removed if necessary. The filtered signal then goes to an analyzer 108 which monitors the signal and sends data to a computer (not shown) for processing and display. Analyzer 108 may be for example a frequency counter for frequency mode, but may also be a multimeter or spectrum analyzer for either mode.

Figure 2:
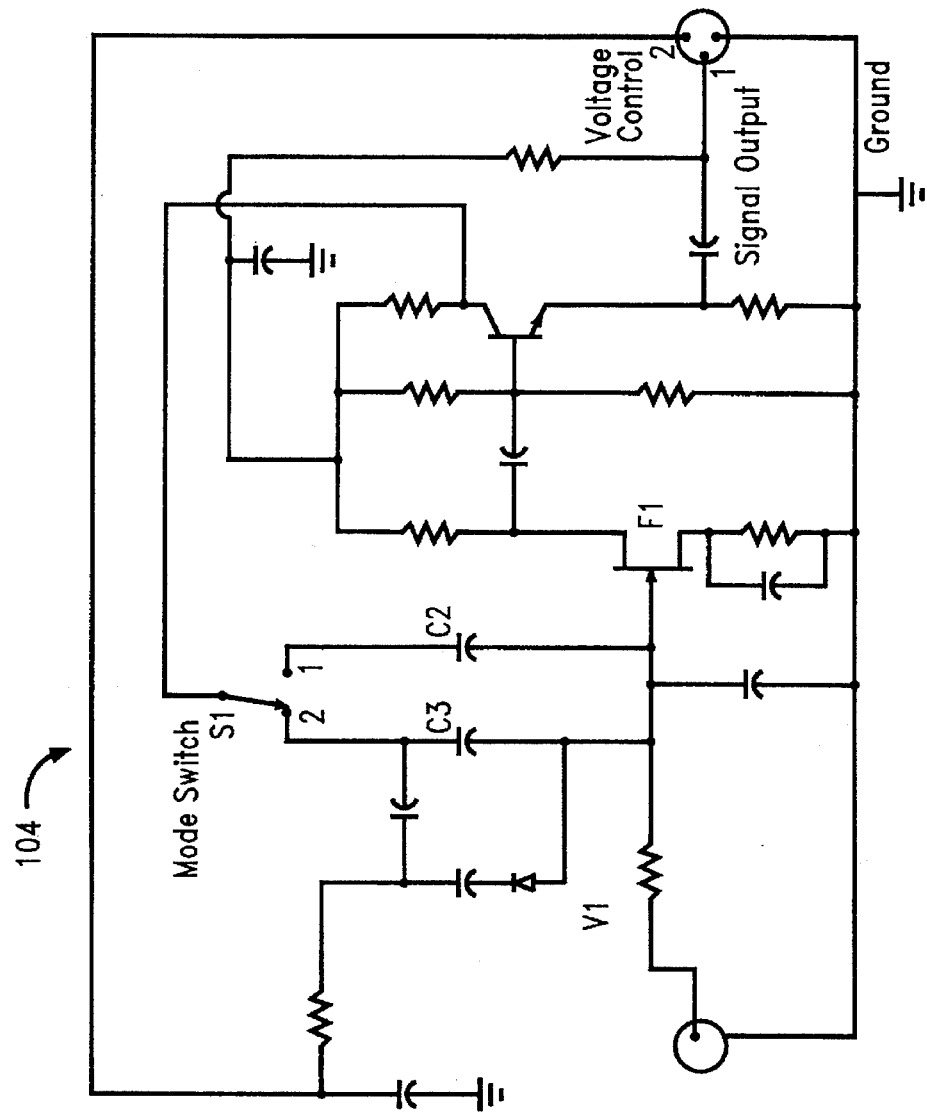
FIG. 2 shows a representative sensor, connection, and oscillator circuit.
Figure 2:
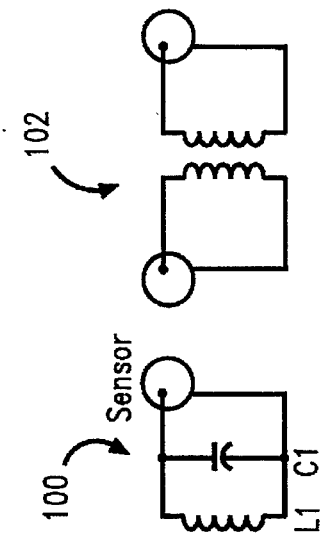

As shown in FIG. 2, sensor 100 is a circuit made of a capacitor C1 and an inductor L1. The field from inductor L1 is used to pass an electromagnetic field through a conductive film on the wafer, which creates an eddy current, placing a load on the sensor circuit. As the film is polished away, the loading changes, and sensor 100 is used to monitor the change in the film thickness. Details of how the sensor circuit operates are described in copending application Ser. No. 08/419,206, which details the manual amplitude mode.

Generally, in manual amplitude mode the capacitor in the amplifier circuit is chosen to produce a circuit gain slightly below the loss due to the conductive film on the wafer (and a larger circuit gain than the loss without the film) in order to produce an oscillation when the film is removed. In frequency mode, a large value capacitor is chosen so that the amplifier circuit will always oscillate and the amplitude is maintained at a constant value. Changes in the film thickness will thus cause a resonant frequency shift, which can be analyzed to determine the polishing endpoint.

Sensor 100 is connected to amplifier 104 by a connector 102 which as shown in FIG. 2 may be for example a contactless inductive type, such as a rotary transformer which enables signal transfer from a rotating wafer carrier to a stationary part of the polishing apparatus.

As the input signal enters amplifier circuit 104, it passes through the gate of the FET F1 and then to the rest of the amplifier. The amplified signal is returned to the gate of FET F1 through mode switch S1. The amplified signal is of the same polarity as the input signal, which is known as positive feedback. When switch S1 is set to mode 1, the circuit operates in frequency mode, and the signal is amplified as it passes through the amplifier and back to FET F1 through capacitor C2. When switch S1 is set to mode 2, the circuit operates in automatic amplitude mode, and the signal passes through varactor V1. Varactor V1 is used to control the signal around capacitor C3. Changing the voltage on varactor V1 changes its capacitance, and therefore the amount of positive feedback around the amplifier. Varactor V1 is automatically controlled by the attached computer via the VOLTAGE CONTROL line (see also FIG. 3) so that the proper circuit gain is set depending on the conductivity of the wafer being polished.

Figure 3:
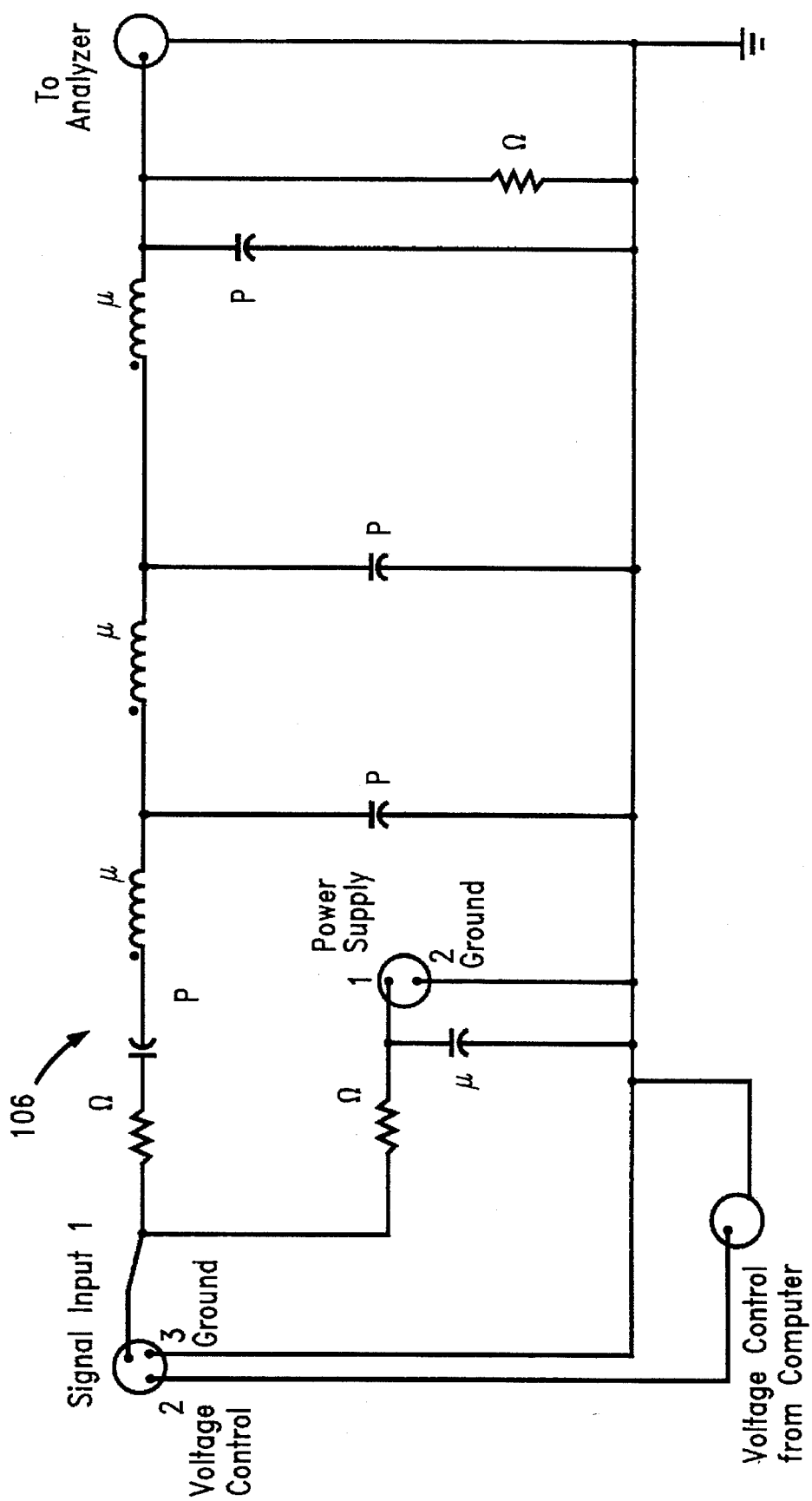
FIG. 3 shows a representative filter circuit; all in accordance with the present invention.

FIG. 3 shows the filter circuit, which consists primarily of a sixth order Chebychev filter. The filter circuit is essential in frequency mode, because it eliminates any high order harmonics and permits the use of a frequency counter (at a very reasonable price versus a spectrum analyzer) to simply count the frequency in order to monitor the polishing and determine the endpoint when the frequency no longer changes. When operating in frequency mode, the signal (in frequency) is displayed on the attached computer screen in a time versus signal plot so that a polish history for each wafer is easily maintained and monitored.

In summary, an endpoint detection apparatus enabling two modes has been described. Frequency mode allows a polish history to be kept for every wafer and provides signal strength and detection sensitivity, and is less affected by external noise. Automatic amplitude mode compensates for changes in wafer conductivity. The ability to choose either mode makes the endpoint detection system well-suited to large scale manufacturing as well as small scale experimentation.

While the invention has been described in terms of specific embodiments, it is evident in view of the foregoing description that numerous alternatives, modifications and variations will be apparent to those skilled in the art. Thus, the invention is intended to encompass all such alternatives, modifications and variations which fall within the scope and spirit of the invention and the appended claims.

What is claimed is:

1. An apparatus for endpoint detection in removal of a film from a semiconductor wafer, comprising:

a sensor for creating a signal responsive to the film removal process;

a positive feedback amplifier coupled to the sensor, the positive feedback amplifier having a mode selector; and an analyzer coupled to the positive feedback amplifier.

2. The apparatus of claim 1 wherein the sensor comprises a capacitor and an inductor.

3. The apparatus of claim 1 wherein the mode selector comprises means for selecting operation in frequency mode.

4. The apparatus of claim 3 further comprising a filter means coupled between the positive feedback amplifier and the analyzer.

5. The apparatus of claim 4 wherein the filter means comprises a multi-order filter.

6. The apparatus of claim 5 wherein the analyzer means comprises a frequency counter.

7. The apparatus of claim 1 wherein the mode selector comprises means for selecting operation in automatic amplitude mode.

8. The apparatus of claim 7 wherein the mode selector comprises means for automatically selecting the gain of the positive feedback amplifier and sensor so that an oscillation is produced when the film is removed from the wafer.

9. The apparatus of claim 8 wherein the means for selecting the gain comprises means for automatically setting a voltage on a varactor.

10. The apparatus of claim 1 wherein the film is removed by chemical-mechanical polishing.

11. A method for in-situ monitoring of removal of a film from a semiconductor wafer, comprising the steps of:

creating a signal responsive to removal of the film from the wafer;

amplifying the signal with a positive feedback amplifier coupled to the sensor, the positive feedback amplifier having a mode selector; and analyzing the signal with an analyzer coupled to the positive feedback amplifier.

12. The method of claim 11 further comprising the step of selecting operation in frequency mode.

13. The method of claim 12 further comprising the step of filtering the signal between the positive feedback amplifier and the analyzer.

14. The method of claim 13 wherein the filtered signal is analyzed with a frequency counter.

15. The method of claim 11 further comprising the step of selecting operation in automatic amplitude mode.

16. The method of claim 15 further comprising selecting the gain of the positive feedback amplifier and sensor so that an oscillation is produced when the film is removed from the wafer.

17. The method of claim 16 wherein the gain is set by automatically setting a voltage on a varactor.

18. The method of claim 11 wherein the film is removed by chemical-mechanical polishing.

* * * * *